(12) United States Patent
Hutsenpiller et al.

(10) Patent No.: US 10,653,212 B2
(45) Date of Patent: May 19, 2020

(54) SNAP-TYPE FASTENER ARRANGEMENT (71) Applicant: NIKE, Inc., Beaverton, OR (US)

(72) Inventors: Scott K. Hutsenpiller, Portland, OR (US); Pamela J. Stafford, Portland, OR (US)

(73) Assignee: NIKE, INC., Beaverton, OR (US)

( * ) Notice: Subject to any disclaimer, the term of this patent is extended or adjusted under 35 U.S.C. 154(b) by 498 days.

(21) Appl. No.: 14/961,356

(22) Filed: Dec. 7, 2015

(65) Prior Publication Data

US 2017/0156450 A1 Jun. 8, 2017

(51) Int. Cl.
A44B 17/00 (2006.01)
A44B 3/00 (2006.01)
B29C 65/48 (2006.01)
B29L 31/00 (2006.01)

(52) U.S. Cl.
CPC ............ *A44B 17/0041* (2013.01); *A44B 3/00* (2013.01); *A44B 17/0005* (2013.01); *A44B 17/007* (2013.01); *A44B 17/0023* (2013.01); *A44B 17/0029* (2013.01); *A44B 17/0047* (2013.01);
(Continued)

(58) Field of Classification Search
CPC ............ A44B 17/0041; A44B 17/0005; A44B 17/0023; A44B 17/0029; A44B 17/0047; A44B 17/007; A44B 17/0076; A44B 3/00; A44B 17/0035; Y10T 24/45775; Y10T 24/4588
See application file for complete search history.

(56) References Cited

U.S. PATENT DOCUMENTS 1,059,979 A 4/1913 Cliff
1,176,619 A 3/1916 Sykes
(Continued)

FOREIGN PATENT DOCUMENTS

DE 2921957 A1 12/1980
FR 856181 6/1940
(Continued)

OTHER PUBLICATIONS

Royal Racing Matrix Shorts, Royal Racing, Published Aug. 4, 2011, Available at: http://www.sicklines.com/gallery/showphoto.php/photo/18908/title/2012-royal-racing-matrix-short/cat/548.
(Continued)

*Primary Examiner* — Victor D Batson
*Assistant Examiner* — Matthew J Sullivan
(74) *Attorney, Agent, or Firm* — Shook, Hardy & Bacon, LLP (57) ABSTRACT A snap-type fastener arrangement includes various elements. For example, the snap-type fastener arrangement includes a socket component and a stud component. The stud component is insertable into the socket component to releasably couple two items together. The snap-type fastener includes a construction having a relatively low profile that does not extensively protrude outward from the underlying article to which the snap-type fastener is attached. The socket component includes a portion for securing the socket component to a textile layer and a central portion that extends through the textile layer. The stud component may be inserted into a socket aperture in the central portion of the socket in order to mate the two components.

12 Claims, 8 Drawing Sheets

(52) U.S. Cl.
CPC .......... *A44B 17/0076* (2013.01); *B29C 65/48* (2013.01); *B29L 2031/7282* (2013.01)

(56) References Cited

U.S. PATENT DOCUMENTS

| | | | |
|---|---|---|---|
| 1,451,612 A * | 4/1923 | Hausner | B65D 5/68 229/125.23 |
| 2,368,100 A | 1/1945 | Boenecke | |
| 2,709,290 A | 5/1955 | Rosenthal | |
| 2,745,159 A | 5/1956 | Jones | |
| 2,838,820 A * | 6/1958 | Hakanson | A44B 17/0029 24/662 |
| 2,838,821 A * | 6/1958 | Shur | A44B 17/0029 24/662 |
| 2,884,647 A * | 5/1959 | Cuttler | A41F 9/002 156/66 |
| 2,895,199 A * | 7/1959 | Jones | A44B 17/0029 24/618 |
| 2,933,793 A | 4/1960 | Steinberg et al. | |
| 2,937,652 A | 5/1960 | Zimmer, Jr. et al. | |
| 3,152,376 A | 10/1964 | Boser et al. | |
| 3,213,507 A | 10/1965 | Bertie et al. | |
| 3,229,342 A * | 1/1966 | Cochran | A44B 17/0029 24/618 |
| 3,360,835 A | 1/1968 | Foertmeyer | |
| 3,540,086 A | 11/1970 | Nysten | |
| 3,551,963 A * | 1/1971 | Mosher, Jr. et al. | A44B 17/0029 24/618 |
| 3,910,155 A | 10/1975 | Wilson et al. | |
| 4,305,171 A | 12/1981 | Pettersson | |
| 4,430,777 A | 2/1984 | Takeda | |
| 4,509,232 A | 4/1985 | Kanzaka et al. | |
| 4,539,735 A | 9/1985 | Kasai | |
| 5,075,938 A * | 12/1991 | Hutchinson | A44B 17/0029 24/108 |
| 5,308,671 A | 5/1994 | Wells | |
| 9,039,318 B2 | 5/2015 | Mantei et al. | |
| 2004/0025306 A1 | 2/2004 | Coffey | |
| 2006/0010658 A1 | 1/2006 | Bigley et al. | |
| 2006/0075537 A1 | 4/2006 | Tsai | |
| 2006/0099864 A1 | 5/2006 | Crumrine et al. | |
| 2009/0139013 A1 | 6/2009 | Sapowycz et al. | |
| 2016/0181729 A1* | 6/2016 | Barth | A41D 1/005 439/37 |
| 2017/0079336 A1* | 3/2017 | Hirschberg | A41D 1/002 |
| 2017/0111555 A1* | 4/2017 | Davis | A45F 5/02 |
| 2017/0238637 A1* | 8/2017 | O'Donnell | A41F 1/004 |

FOREIGN PATENT DOCUMENTS

| | | | |
|---|---|---|---|
| GB | 796811 A * | 6/1958 | ......... A44B 17/0005 |
| JP | 4336036 B2 | 9/2009 | |
| WO | 8800881 A1 | 2/1988 | |

OTHER PUBLICATIONS

International Search Report and Written Opinion dated Feb. 24, 2017 in International Application No. PCT/US2016/065346, 16 pages.

International Preliminary Report on Patentability dated Jun. 21, 2018 in International Patent Application No. PCT/US2016/065346, 11 pages.

Communication under Rule 71(3) dated Sep. 18, 2019 in European Patent Application No. 16822819.5, 38 pages.

* cited by examiner

SNAP-TYPE FASTENER ARRANGEMENT

SUMMARY

In brief, and at a high level, this disclosure describes a snap-type fastener having a socket component and a stud component. The stud component is insertable into the socket component to releasably couple two items together. The snap-type fastener includes a construction having a relatively low profile that does not extensively protrude outward from the underlying article to which the snap-type fastener is attached. Generally, the socket component includes an attachment base for securing the socket component to a textile layer and a central portion that extends through the textile layer. The stud component may be inserted into a socket aperture in the central portion of the socket in order to mate the two components.

Another aspect of the disclosure relates to a method for manufacturing a snap-type fastener arrangement. The method includes positioning a bonding agent between the socket component and an article layer. A portion of the socket component is then inserted through an aperture in the article layer, and the bonding layer is activated. Another article layer may then be coupled to the socket component, such that the socket component is layered between the two article layers.

Aspects of the technology are defined by the claims below, not this summary. A high-level overview of various aspects of the technology is provided in this section to introduce a selection of concepts that are further described below in the detailed description. This summary is not intended to identify key features or essential features of the claimed subject matter, nor is it intended to be used as an aid in isolation to determine the scope of the claimed subject matter.

BRIEF DESCRIPTION OF THE DRAWINGS

The present technology is described in detail with reference to the attached drawing figures, which are incorporated herein, wherein.

DETAILED DESCRIPTION

Subject matter is described throughout this Specification in detail and with specificity in order to meet statutory requirements. But the aspects described throughout this Specification are intended to be illustrative rather than restrictive, and the description itself is not intended necessarily to limit the scope of the claims. Rather, the claimed subject matter might be practiced in other ways to include different elements or combinations of elements that are similar to the ones described in this Specification and that are in conjunction with other present, or future, technologies. Upon reading the present disclosure, alternative aspects may become apparent to ordinary skilled artisans that practice in areas relevant to the described aspects, without departing from the scope of this disclosure. It will be understood that certain features and subcombinations are of utility and may be employed without reference to other features and subcombinations. This principle is contemplated by and is within the scope of the claims.

Generally the present disclosure is related to a snap-type fastener used to releasably couple items together (e.g., portions of a garment, a footwear article, a bag, or other articles). At a high level, the snap-type fastener includes a stud component that releasably mates with a socket component to either attach or separate the snap-type fastener. For example, the stud component may be inserted into an aperture of the socket component to connect the snap-type fastener, and the stud component may be pulled from the socket aperture to disconnect the snap-type fastener. In accordance with an aspect of the present invention, the socket component of the snap-type fastener includes a profile or thickness that minimizes an extent to which the socket component extends outward from an underlying article layer. That is, the socket component does not protrude extensively from the article layer and creates a relatively low-profile affect. Furthermore, when the socket component and the stud component are connected, the overall thickness of the snap-type fastener does not cause the snap-type fastener to extensively protrude from underlying article layers. These features, and other characteristics, will be described in more detail in other parts of this Detailed Description.

Exemplary Combination of a Socket and a Stud

Figure 1A:
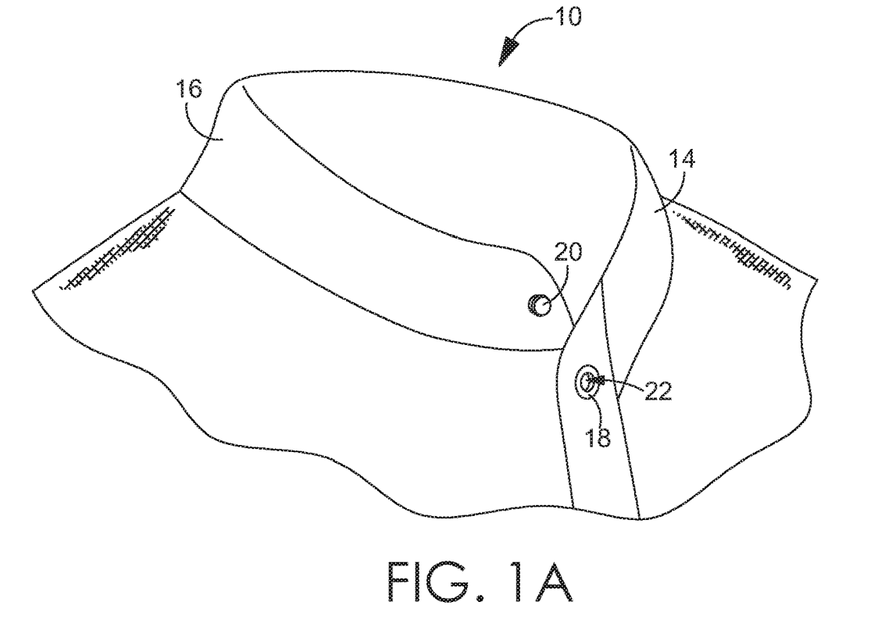
FIG. 1A depicts a garment including a snap-type fastener in a decoupled arrangement in accordance with an aspect hereof.
Figure 1B:
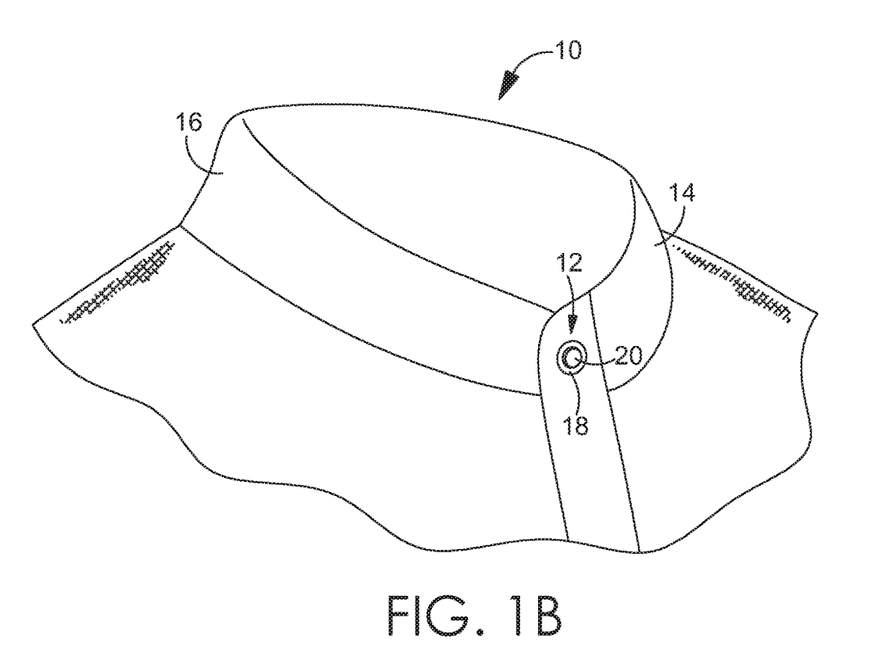
FIG. 1B depicts the garment of FIG. 1A with the snap-type fastener in a coupled arrangement in accordance with an aspect hereof.

As discussed, the present technology may be used as a closure for various articles. A representative article is shown in FIGS. 1A and 1B depicting a portion of an article of clothing 10 with the snap-type fastener 12. Specifically, the article shown, which may be part of a shirt or part of a jacket, includes a collar having a first collar portion 14 and a second collar portion 16 coupled by a snap-type fastener 12.

In FIG. 1A, the snap-type fastener 12 and the collar portions 14 and 16 are decoupled. The snap-type fastener 12 includes a socket component 18 and a stud component 20. The socket component 18 is attached to the first collar portion 14, while the stud component is attached to the second collar portion 16. However, the socket component may alternatively be coupled to the second collar portion 16, while the stud component 20 may be attached to the first collar portion 14. The socket component 18 includes a socket aperture 22 through which the stud component 20 may be inserted. FIG. 1B shows the snap-type fastener 12 in a closed position. When inserted into the socket aperture 22 of the socket component 18, the stud component 20 attached to the second collar portion 16 releasably mates with the socket component 18, thereby coupling the first collar portion 14 and the second collar portion 16.

FIGS. 1A and 1B depict a shirt or jacket, but it is contemplated that the snap-type fastener 12 may be used with various other articles or apparel items. For example, the snap-type fastener 12 may be used to couple a pocket flap to a pocket, such as on a pair of shorts or pants or on a non-apparel article, such as a bag. In addition, the snap-type fastener 12 may be used to releasably secure a fly portion of pants or shorts. The snap-type fastener 12 may also be used to releasably secure two sides of a shirt sleeve cuff, two sides of a pant leg cuff, or a shirt collar to the back of a shirt. In FIGS. 1A and 1B, the snap-type fastener 12 releasably couples two portions of the same article (i.e., two portions of the same shirt or jacket). Alternatively, one or more snap-type fasteners 12 may be used to removably couple two discrete articles, such as a removable hood and a jacket. Similarly, the snap-type fastener 12 may be used on convertible garments to temporarily affix two separate garments, such as an inner layer of a jacket to an outer layer of a jacket. In other aspects, the snap-type fastener 12 may be used to couple two or more portions of a footwear article together.

Figure 2A:
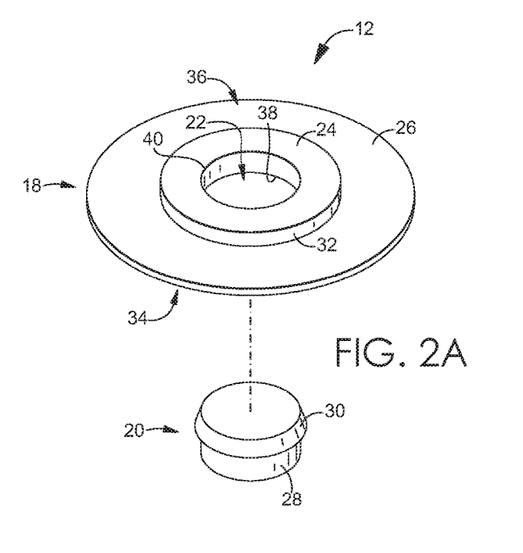
FIG. 2A depicts a perspective view of a socket component and a stud component in a decoupled arrangement in accordance with an aspect hereof.
Figure 2B:
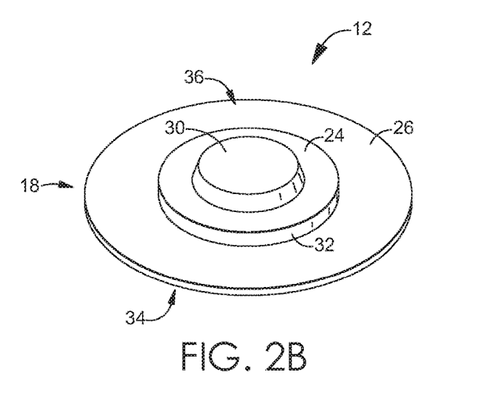
FIG. 2B depicts a perspective view of the socket component and the stud component in a coupled arrangement in accordance with an aspect hereof.

FIGS. 2A and 2B show the socket component 18 and the stud component 20 unmated and mated, respectively. The socket component 18 generally includes a central portion 24 and an attachment base 26. The central portion 24 forms a periphery around the socket aperture 22 and may be raised above the attachment base 26 (i.e., may include a portion that extends beyond an upward-facing surface of the attachment base 26). The attachment base 26 radially extends away from the central portion 24 and the socket aperture 22 and provides one or more surfaces that may be used to attach the socket component 18 to one or more textile layers. Generally, the stud component 20 is insertable through the socket aperture 22 to couple the stud component 20 to the socket component 18 (as illustrated in FIG. 2B), and additional aspects of the stud component 20 and the socket component 18 are described in the below sections of this Detailed Description.

Exemplary Socket Components

Figure 3:
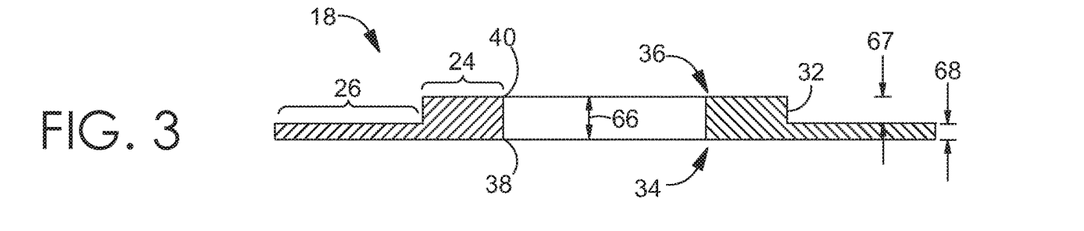
FIG. 3 depicts a cross-sectional side view of a socket component in accordance with an aspect hereof.
Figure 4:
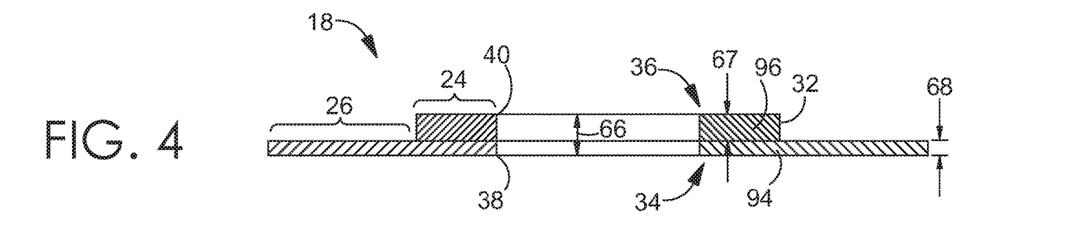
FIG. 4 depicts a cross-sectional side view of an alternative socket component in accordance with an aspect hereof.

Additional elements of the socket component 18 will now be described, and reference may be made to the elements depicted in FIGS. 2A, 3, and 4. For illustrative purposes, FIGS. 3 and 4 provide cross-sectional views of a socket component in accordance with aspects of the present disclosure. As previously described, the socket component 18 generally includes the central portion 24 and the attachment base 26. In addition, a shoulder 32 on the socket component 18 generally provides a stepped transition between the attachment base 26 and the central portion 24. As will be described in other portions of this disclosure, the attachment base 26, the shoulder 32, and the central portion 24 combine to include a thickness or profile that does not protrude extensively from an underlying article layer to which the socket component 18 is attached.

The socket component 18 also includes portions that are oriented relative to the stud component 20 in the context of the snap-type fastener 12. For example, the socket component 18 includes a stud-insertion side 34 that generally faces towards a direction from which the stud component 20 advances when the stud component 20 is inserted into the socket aperture 22. The socket component 18 may also include a stud-exit side 36 that generally opposes the stud-insertion side 34 and faces away from the direction from which the stud component 20 advances. On the stud-insertion side 34, the central portion 24 may include a lip 38 that is part of the central portion 24 surrounding the socket aperture 22 defining a stud-insertion end of the socket aperture 22. That is, the lip 38 generally refers to the perimeter edge or corner of the central portion 24 that forms the mouth or stud-entrance portion of the aperture 22. Similarly, the central portion 24 may include a collar 40 that is part of the central portion 24 surrounding the socket aperture 22 at the stud-exit side 36 defining a stud-exit end (see e.g., stud-exit end 64 in FIG. 6) of the socket aperture 22. The collar 40 generally refers to the perimeter edge or corner of the central portion 24 that forms the stud-exit portion of the aperture 22.

The socket component 18 includes various dimensions that affect a size of the socket component 18 and that may contribute to a relatively low-profile (such as when coupled to an article). For example, the central portion 24 of the socket component 18 includes a first thickness 66 that extends between the stud-insertion side 34 and the stud-exit side 36. In addition, the attachment base 26 includes a second thickness 68 between the first surface 54 and the second surface 56 (see e.g., surfaces 54 and 56 in FIG. 5). In aspects of this technology, the first thickness 66 of the central portion 24 is greater than the second thickness 68 of the attachment base 26. In addition, the shoulder 32 includes a shoulder height 67 that extends between the second surface 56 of the attachment base and the stud-exit side 36. The shoulder height 67 may also be equal to the first thickness 66 minus the second thickness 68.

Additionally, the various thicknesses may be within a range of thicknesses. For example, in one aspect the first thickness 66 is in a range of about 4 Mil to about 8 Mil (i.e., about 0.004 inches to about 0.008 inches). For instance, the second thickness 68 may be in a range of about 1 Mil to about 3 Mil (0.001 inches to 0.003 inches). In accordance with these exemplary, the shoulder height 67 may be in a range of about 3 Mil to about 5 Mil (i.e., about 0.003 inches to about 0.005 inches). Using these ranges, an exemplary socket component 18 might have a first thickness 66 of about 6 Mil (i.e., about 0.006 inches), a second thickness of about 2 Mil (i.e., about 0.002 inches), and a shoulder height of about 4 Mil (i.e., about 0.004 inches). But these ranges are merely exemplary of one aspect of the disclosure, and other aspects of the disclosure may include thicknesses that are outside of these ranges. In addition, these exemplary ranges provide for a second thickness 68 being smaller than the shoulder height 67. And in other aspects the second thickness 68 may be larger than the shoulder height 67.

In one aspect, the low-profile nature of the socket component 18 is aided by constructing the socket component 18 from a thermoplastic polyurethane (TPU) material. TPU may have various properties including elasticity, durability, resistance to abrasion, selectable ranges of transparency, and resistance to oil, grease, water, and the like. Further, in another aspect, the socket component 18 may comprise one of a polyester-based TPU or a polyether-based TPU. Polyether-based TPU may include microbial resistance or flexibility at lower temperatures is desired, and polyester-based TPU may include desirable abrasion-resistance traits, adhesion strength, chemical resistance, and resistance to heat aging. In yet another aspect, the socket component 18 may comprise a rubber material where the types of rubber may comprise butadiene rubber, ethylene propylene rubber, hydrogenated nitrile rubber, isoprene rubber, natural rubber, polychloroprene rubber, polyurethane rubber, styrene butadiene rubber, and such.

The socket component may have different one-part or multi-part constructions. For example, the socket component 18 of FIG. 3 is illustrated to include an integrated or one-piece construction, which may be achieved using injection molding, casing casting, 3D printing, ablation, or other manufacturing techniques. And in an alternative aspect depicted in FIG. 4, the socket component 18 may include a multi-layered construction. For example, the socket component 18 may comprise a base layer 94 and a top layer 96 overlaid on the base layer 94 (e.g., TPU layers). The top layer 96 and the base layer 94 may be annular, and each may include a center aperture. The apertures may be aligned so that, when layered with one another, the apertures form a single socket aperture 22 through both the top layer 96 and the base layer 94. The diameter of the top layer 96 may be smaller than the diameter of the base layer 94. With this layered approach, the central portion 24 of the socket component 18 comprises the top layer 96 and a radially central portion of the base layer 94, and the attachment base 26 comprises a radially distal portion of the base layer 94. Although only two layers are depicted for illustrative purposes, in other aspects the socket component 18 may have more than two layers.

In the aspect depicted in FIG. 4, layers 94 and 96 may have respective thicknesses that contribute to the socket component 18 having the dimensions 66, 67, and 68. For example, the base layer 94 may have a thickness in a range of about 1 Mil to about 3 Mil (i.e., about 0.001 inches to about 0.003 inches), and the top layer 96 may have a thickness in a range of about 3 Mil to about 8 Mil (i.e., about 0.003 inches to about 0.008 inches). As such, the combined thickness of the base layer 94 and the top layer 96 may be in a range of about 5 Mil to about 8 Mil (i.e., about 0.005 inches to about 0008 inches). As previously indicated, these ranges are merely exemplary of one aspect of the disclosure, and other aspects of the disclosure may include thicknesses that are outside of these ranges.

The socket components 18 may include other dimensions that contribute to its functionality in the context of the snap fastener, such as various part widths or diameters. For instance, when the socket component 18 includes an annular configuration, the aperture 22 may have a diameter that is sized to effectively receive and mate with a stud component. In one aspect, the aperture 22 includes an aperture diameter in a range of about 0.16 inches to about 0.24 inches. In addition, the central portion 24 may include a diameter or width of about 0.43 inches to about 0.52 inches. In a further aspect, the overall width or diameter of the attachment base may be in a range of about 0.66 inches to about 0.75 inches. However, these non-limiting ranges are provided for exemplary purposes, and in other aspects of the present invention the socket component may include different dimensions that are larger or smaller than the described ranges.

Exemplary Socket Components with One or More Article Layers

Figure 5:
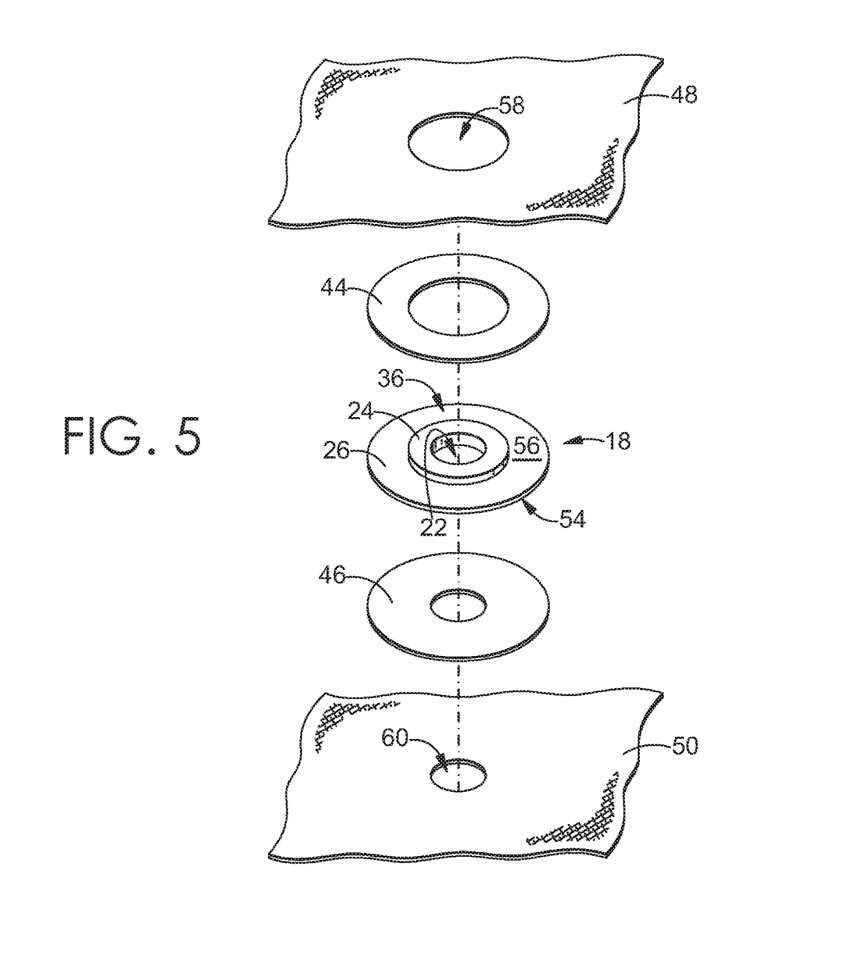
FIG. 5 depicts an exploded view of a socket component coupled to article layers in accordance with an aspect hereof.

In an aspect of the present disclosure, the socket component 18 is incorporated into an article, and FIG. 5 provides an exploded view of the socket component 18 with various textile layers. That is, the socket component 18 is layered between a first textile layer 48 and a second textile layer 50. In addition, a first bonding layer 44 is illustrated between the socket component 18 and the first textile layer 48, and a second bonding layer 46 is illustrated between the socket component 18 and the second textile layer 50. As described above, the socket component 18 includes the central portion 24 and the attachment base 26. The attachment base 26 includes a first surface 54 on the stud-insertion side 34 and a second surface 56 on the stud-exit side 36. The second surface 56 of the attachment base 26 is configured to receive the first bonding layer 44, which includes a bonding agent and couples the second surface 56 to the first textile layer 48. As depicted in FIG. 5, the first textile layer 48 includes a first-textile aperture 58, and the central portion 24 passes through the first-textile aperture 58.

The first surface 54 of the attachment base 26 may receive a second bonding layer 46 that comprises a bonding agent, and the second bonding layer 46 may bond the first surface 54 to the second textile layer 50. The second textile layer 50 includes a second-textile aperture 60 that corresponds to the socket aperture 22. That is, when the second textile layer 50 is coupled against the first surface 54, then the second-textile aperture 60 is aligned with the aperture 22. In some aspects, the first textile layer 48 and the second textile layer 50 are bonded to the socket component 18 and are coupled to one another (or to other portions of an article) to form a placket on an apparel item.

In FIG. 5, bonding layers are depicted, such as bonding discs having an adhesive agent, which may be heat activated or pressure activated. For example, thermoplastic adhesives may be used to bond the socket component 18 to the first textile layer 48 and to the second textile layer 50, as well as to bond the first textile layer 48 to the second textile layer 50 in regions adjacent to the socket component 18. However, in other aspects of the present invention, alternative coupling techniques and mechanisms may be used to attach the socket component 18 to the article layers and the article layers to each other. Other exemplary coupling techniques and mechanisms include stitching, sonic welding, taping, riveting, and the like.

Figure 6:
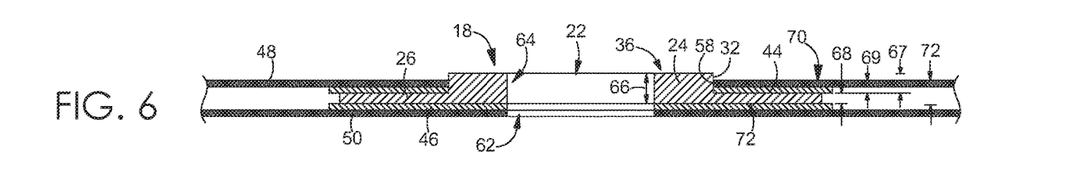
FIG. 6 depicts a cross-sectional side view of the socket component coupled to article layers in accordance with an aspect hereof.

Referring to FIG. 6 a cross-sectional view of the socket component 18 is provided, in which the socket component 18 is layered between, and coupled to, the first textile layer 48 and the second textile layer 50. As previously described, the first bonding layer 44 bonds the second surface 56 of the attachment base 26 to the first textile layer 48, and the second bonding layer 46 bonds the first surface 54 of the attachment base 26 to the second textile layer 50. The shoulder 32 passes inside a perimeter of the aperture 58 in the first textile layer 48, so that the central portion 24 of the socket component 18 extends through the first textile layer 48.

In an aspect of the present disclosure, the socket component 18 is relatively low-profile, such that the socket component does not protrude extensively from the one or more textile layers 48 and 50. The extent to which the socket component 18 protrudes may be quantified based on dimensions of the socket component 18 and the article layers. For instance, bonding the first textile layer 48 to the second surface 56 of the attachment base 26 creates a thickness 72 between the first surface 54 of the attachment base 26 and an outward-facing surface 70 of the first textile layer 48, the outward-facing surface 70 generally facing away from the second surface 56. In addition, the combination of the first textile layer 48 and the first bonding layer 44 may include a combined thickness 69.

One or more of the dimensions of the socket component 18 and the textile layer 48 may contribute to a low-profile feature. For instance, the thickness 72 may be about the same thickness as the first thickness 66 or may be marginally smaller than the first thickness 66 (e.g., at least about 75% of the thickness), such that the outward-facing surface 70 of the textile layer 48 is substantially flush with the central portion 24. Yet, the first thickness 66 may still be relatively small to provide the socket component 18 with a low profile that does not extensively protrude from the textile layer 48. In addition, the shoulder height 67 may have a dimension that is relatively similar to the combined thickness 69 of the first textile layer 48 and the first bonding layer 44. For instance, the socket component 18 may be substantially flush with, or extend less than 2 millimeters beyond, the outward-facing surface 70 of the first textile layer 48. In other words, the shoulder height 67 might be greater than the combined thickness by less than about 2 mm.

Figure 7:
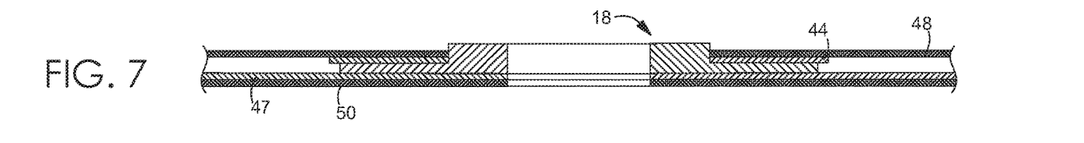
FIG. 7 depicts a cross-sectional side view of the socket component coupled to article layers in accordance with another aspects.

Referring now to FIG. 7 another aspect of the present invention is illustrated. FIG. 7 includes another cross-sectional view taken from a perspective similar to FIG. 6, and the aspect depicted by FIG. 7 is similar to FIG. 6 in various respects. For example, the socket component 18 is layered between a first textile layer 48 and a second textile layer 50. In addition, a first bonding layer 44 bonds the socket component 18 to the first textile layer 48. In addition, the socket component 18 is bonded to the second textile layer 50. The aspect depicted in FIG. 6 is different from FIG. 7 in that the second bonding layer 47 includes a bonding-agent film, as opposed to a bonding disk illustrated in FIGS. 5 and 6. That is, a film of bonding agent may be applied to the second textile layer 50, and the film my bond the second textile layer 50 to the socket component 18 and to the first textile layer 48.

Figure 8:
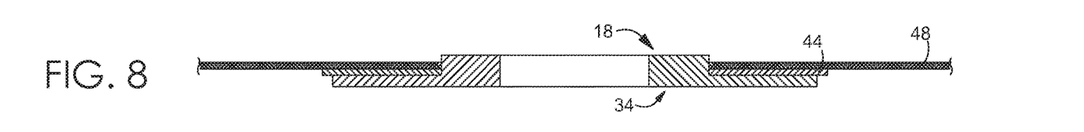
FIG. 8 depicts a cross-sectional side view of the socket component coupled to one article layer in accordance with another aspect of the disclosure.

FIG. 8 illustrates another aspect of the present disclosure. In FIG. 6, the socket component 18 is coupled to the first textile layer 48 by the bonding layer 44. In addition, the stud-insertion side 34 of the socket component 18 is exposed on a backside of the first textile layer 48. That is, the second textile layer 50 (depicted in FIGS. 6 and 7) is omitted in the aspect depicted by FIG. 8. FIG. 8 also illustrates that a diameter or width of the bonding layer 44 is larger than a diameter or width of the attachment base 26. Among other things, the textile layer 48 may be impeded from pulling away from the socket component 18 when the bonding layer 44 extends past the edge of the socket component 18 (due to the larger size).

Figure 9:
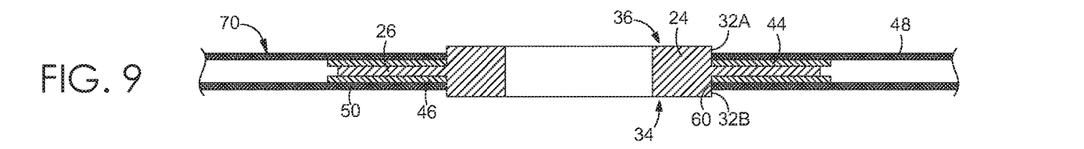
FIG. 9 depicts a cross-sectional side view of an alternative socket component in accordance with another aspect of the disclosure.

Referring now to FIG. 9, an alternative aspect of a socket component 18 is depicted that includes a protruding central portion on both sides of the attachment base 26. That is, a first shoulder 32A is positioned on the stud-exit side 36 to provide a first stepped transition from the attachment base 26 to the central portion 24. In addition, a second shoulder 32B is positioned on the stud-insertion side 36 to provide a second stepped transition from the attachment base 26 to the central portion 24. As such a ridge is created on the stud-insertion side 34, in addition to the ridge created on the stud-exit side 36. Among other things, the shoulder 32B may help to protect a perimeter edge of the aperture 60 in the second layer 50.

Exemplary Stud Component

Figure 10:
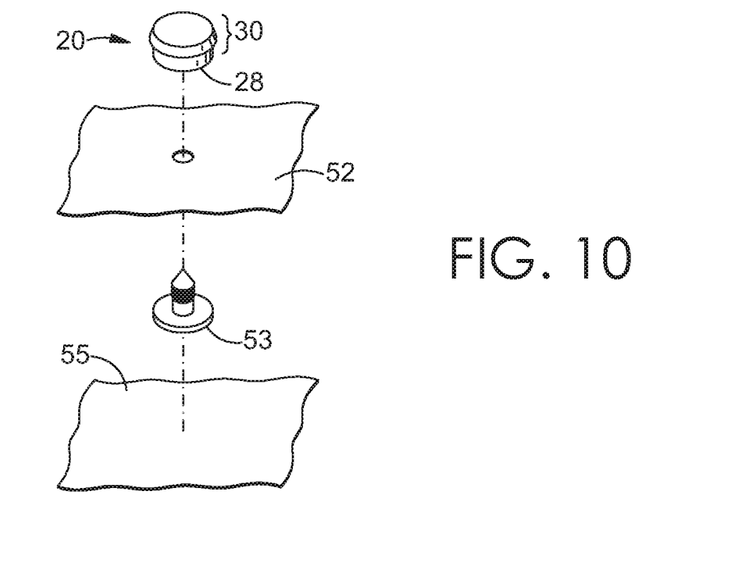
FIG. 10 depicts an exploded view of a stud component coupled to an article layer in accordance with an aspect hereof.
Figure 11:
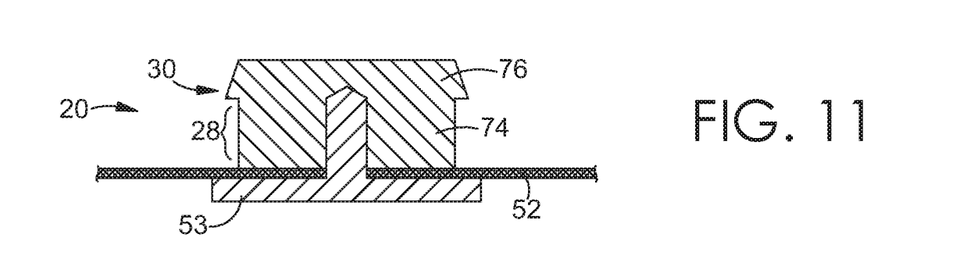
FIG. 11 depicts a cross-sectional side view of the stud component coupled to an article layer in accordance with an aspect hereof.

As previously described, the stud component 20 is releasably insertable into the aperture 22 of the socket component 18, as depicted in FIGS. 2A and 2B. In addition, FIGS. 10 and 11 provide exemplary illustrations the stud component 20 in combination with a textile layer 52 to which the stud component 20 might be attached. FIG. 10 provides an exploded view of the stud component 20 and the article layer 52, whereas FIG. 11 provides a cross-sectional side view.

The stud component generally includes a prismatic base 28. The base generally functions as a foundation from which other stud elements extend, or to which other stud elements attach. The base 28 is depicted in FIGS. 10 and 11 as generally cylindrical, but the base 28 may include various other geometric or organic shapes. The stud 20 includes a radial extension 30 that extends radially outward from the base 28. In addition, the stud 20 includes a stud backer backing 53 that attaches to an end of the base 28 and that may be used to clamp the stud 20 to an article layer 52.

The stud component 20 is attached to the third textile layer 52 at the stud-attachment base 28. In one aspect, a stud backing 53 may be positioned on an opposing side of the textile layer 52 and may pass an opening in through the third textile layer 52 to attach to the stud-attachment base 28. The stud backing 53 may include a vertically-extending member that is inserted into a cavity of the stud component 20 to attach the stud backing 53 to the stud component 20. In other aspects, the third textile layer 52 may be clamped between a stud backing 53 and the stud-attachment base 28. Further, the stud backing 53 may be also attached to a fourth textile layer 55 (FIG. 10) such that the stud backing 53 is embedded between the fourth textile layer 55 and the third textile layer 52. The fourth textile layer 55 may act to reinforce the third textile layer 52 from which the stud component 20 protrudes to reduce breakage between the stud component 20, the stud backing 53 and the third textile layer 52. In other aspects, various other methods of attachment may be used.

Figure 12:
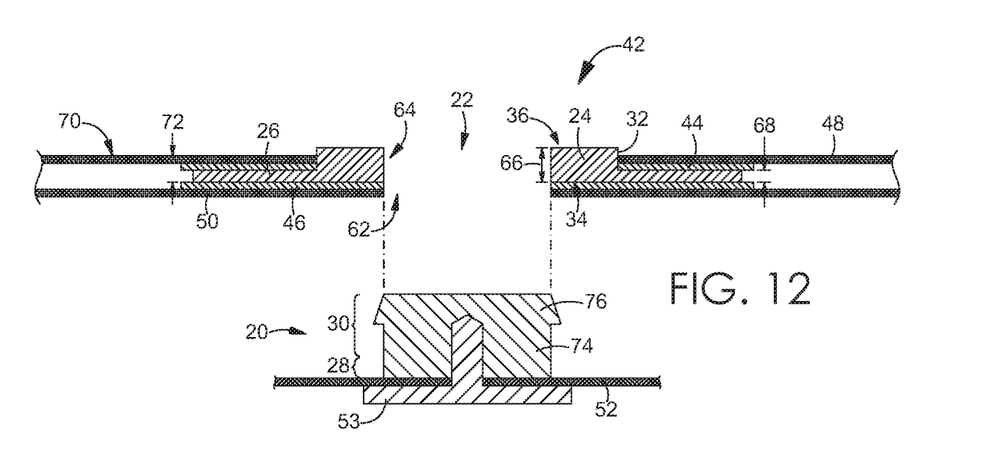
FIG. 12 depicts a cross-sectional side view of the snap-type fastener decoupled in accordance with an aspect hereof.
Figure 13:
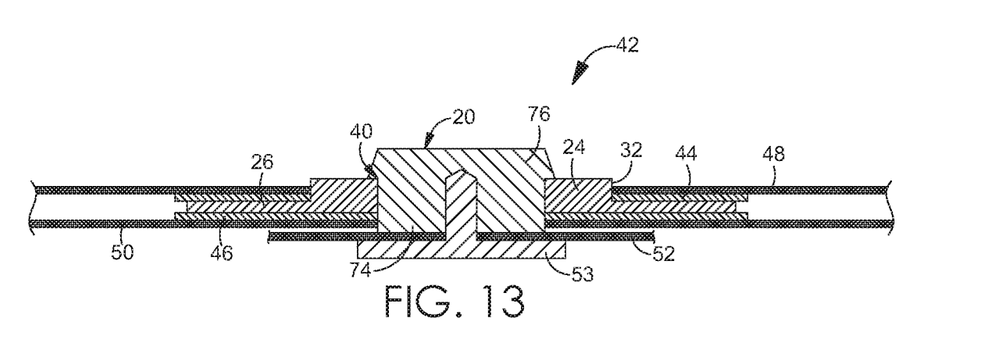
FIG. 13 depicts a cross-sectional side view of the snap-type fastener coupled to an article and in a coupled arrangement in accordance with an aspect hereof.

Referring to FIGS. 12 and 13, a cross-sectional view of the snap-type fastener arrangement 42 is provided in which the socket component 18 is coupled to textile layers 48 and 50 and the stud component is coupled to the article layer 52. In addition, FIG. 12 illustrates the socket component 18 and the stud component 20 in a decoupled arrangement, such that the third textile layer 52 is decoupled from the first textile layer 48 and the second textile layer 50. As previously explained, the third textile layer 52 can be coupled to the first textile layer 48 and the second textile layer 50 by releasably mating the stud component 20 to the socket component 18. That is, the extension member 30 of the stud component 20 is inserted into the stud-insertion end 62 of the socket aperture 22 and may engage with the central portion 24 of the socket component 18, as depicted in FIG. 13.

In a further aspect, the stud component 20 is configured to smoothly engage with the socket component 18. For instance, the extension member 30 of the stud component 20 may be inserted into the stud-insertion end 62 of the socket aperture 22 and extend through the stud-exit end 64 of the socket aperture 22. In one aspect, the stud component 20 includes an axially aligned portion 74 that is aligned with the axis of the socket aperture 22 and a radially extending portion 76 that extends radially outward. The radially extending portion 76 may have a greater diameter than the collar 40 of the stud component 20 and may be positioned on the extension member 30, so that when the stud component is inserted into the socket aperture 22, the radially extending portion 76 engages with the collar 40 of the central portion 24. In accordance with an aspect of the present disclosure, because the first thickness 66 of the central portion 24 is not significantly thicker than the article layer, the stud component 20 may also be configured to be relatively short while still being able to engage with the collar 40 of the central portion 24.

Figure 14A:
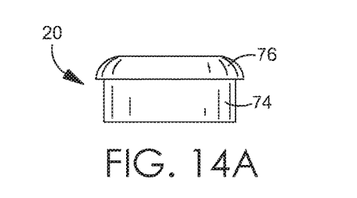
FIGS. 14A-14I depict various alternative configurations of the stud component of the snap-type fastener arrangement in accordance with aspects hereof.
Figure 14B:
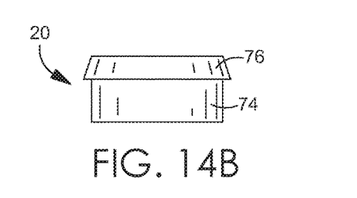
Figure 14C:
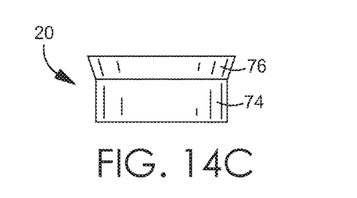
Figure 14D:
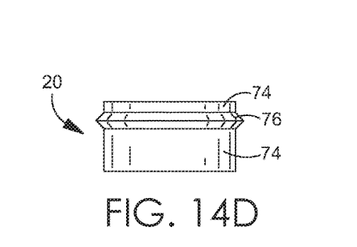
Figure 14E:
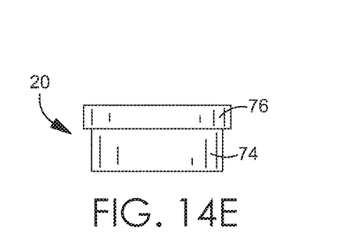
Figure 14F:
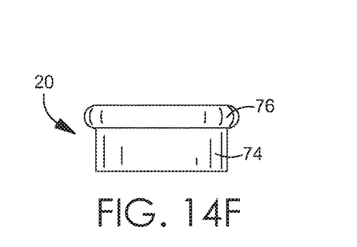
Figure 14G:
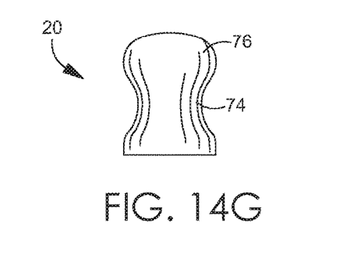

In alternative aspects of the present disclosure, various other shapes of the stud component 20 may be used, as shown in FIGS. 14A-14I. As described above and provided in FIGS. 14A-14G, a stud component 20 may include a radially extending portion 76 (which is usable to engage the collar 40 of the central portion 24 of the socket component 18). FIG. 14A shows a stud component 20 in which the radially extending portion 76 is a curved shaped that is convex with respect to the axially aligned portion 74. In FIG. 14B, the radially extending portion 76 comprises a trapezoid shape; while in FIG. 14C, the radially extending portion 76 is an inverted-trapezoidal shape extending from the top of an axially aligned portion 74. In FIG. 14D, a radially extending portion 76 comprises a rib positioned between two axially aligned portions. FIG. 14E provides a stud component 20 with a squared lip as a radially extending portion 76; whereas, the radially extending portion 76 in the stud component 20 depicted in FIG. 14F is a rounded lip. As shown in FIG. 14G, the stud component 20 may comprise an axially aligned portion 74 with a concave surface extending into a bulbous radially extending portion 76. In these aspects, the radially extending portion 76 of the stud component 20 may engage with the collar 40 of the central portion 24 or may engage with a projection or ridge on the surface of the central portion 24 surrounding the socket aperture 22.

Figure 14H:
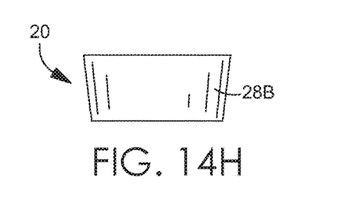
Figure 14I:
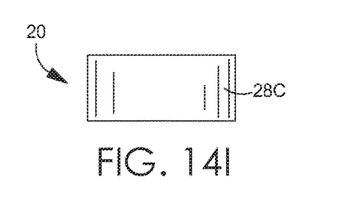

Unlike in FIGS. 14A-14G, the stud components 20 in FIGS. 14H-14I do not include a radially extending portion. FIG. 14H depicts a stud component 20 with a tapered base 28B, while FIG. 14I includes a stud component 20 with a cylindrical base 28C. In these aspects, the stud component 20 may frictionally engage with the central portion 24 when mated with the socket component 18. In some aspects, regardless of whether the stud component 20 has a radially extending portion 76, the stud component 20 may engage with the central portion 24 of the socket component 18 through magnetic components of the stud component 20 and the socket component 18. For instance, if the stud component 20 is constructed of a metallic material, then the socket component 18 may include a magnetic element constructed into the central portion and positioned to be attracted to the metallic stud component.

The shapes of the stud component 20 illustrated in FIGS. 14A-14I are generally cylindrical shapes and could be releasably mated to a socket component 18 having an annular-shaped socket aperture 22, including an annular lip 38 and collar 40. In other aspects, the stud component 20 may be generally a non-cylindrical shape, such as a rectangular shape, and may be mated to a socket component 18 with a socket aperture 22 with a shape generally corresponding to the stud component 20. In addition to having an annular-shaped socket aperture 22, some aspects include an annular-shaped central portion 24 and attachment base 26. The diameter of the socket aperture 22 may be smaller than the diameter of the central portion 24, which in turn may be smaller than the diameter of the attachment base 26.

Further, in some aspects, the stud component 20 may include a stud aperture coaxially aligned with the socket aperture 22 when mated with the socket component 18. A stud aperture may be used to create an opening between two sides of the snap-type fastener arrangement 42 through which a cord, such as a headphone cord, could be placed.

The stud component 20 may similarly be constructed from TPU as described above or of other plastics such as polyethylene, polypropylene, polymethyl methacrylate, and the like. In another aspect, the stud component 20 may be constructed from a rubber material such as butadiene rubber, ethylene propylene rubber, hydrogenated nitrile rubber, isoprene rubber, natural rubber, polychloroprene rubber, polyurethane rubber, styrene butadiene rubber. Alternatively, the stud component may be constructed from a metallic material such as aluminum, steel, iron, and the like.

Alternative Aspect of a Snap-Type Fastener

Figure 15:
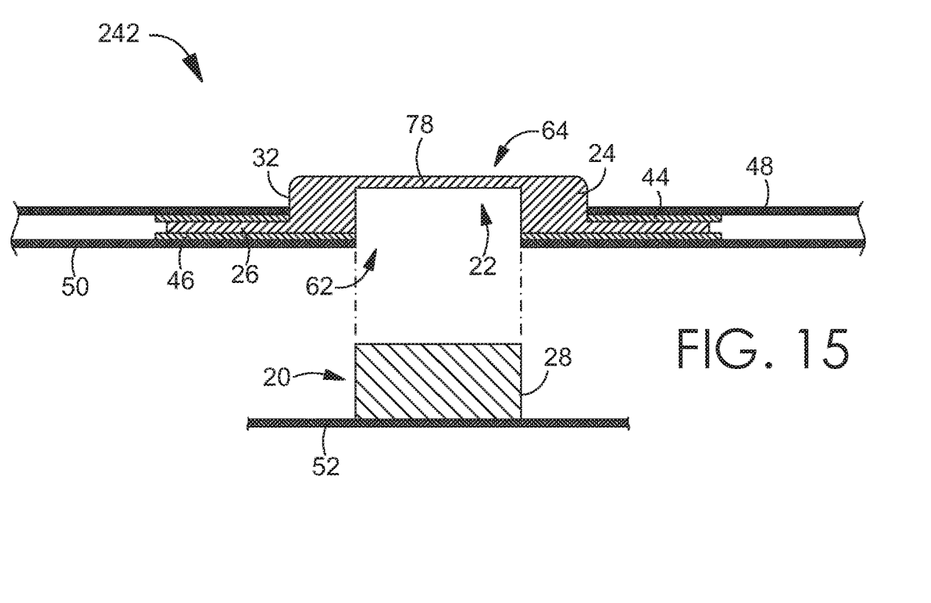
FIG. 15 depicts a cross-sectional side view of another snap-type fastener arrangement in accordance with an alternative aspect hereof.

Turning now to FIG. 15, a snap-type fastener arrangement 242 with an alternative socket component 218 is provided. That is, as shown in in FIGS. 12 and 13, the socket aperture 22 may be continuously open from the stud-insertion end 62 to the stud-exit end 64, so that when the stud component 20 is inserted into the socket aperture 22, the extension member 30 may extend beyond the stud-exit end 64. In the aspect depicted in FIG. 15, however, the central portion 24 includes a socket-aperture cap 78 that covers the socket aperture 22 at the stud-exit end 64. In FIG. 15, the base 28 (i.e., axially aligned portion) of the stud component 20 is inserted through the stud-insertion end 62 of the socket aperture but is blocked from extending through the stud-exit end 64 by the cap 78. Additionally, in the aspect shown in FIG. 15, the first textile layer 48 includes a first-textile aperture 58 through which the central portion 24, including the socket-aperture cap 78, extends. In alternative aspects, the first textile layer 48 may not include the first-textile aperture 58 and may be bonded over the socket-aperture cap 78, such that the socket component 18 is obscured by the first textile layer 48.

Exemplary Method of Manufacturing

Another aspect of the technology includes a method of manufacturing 80 a snap-type fastener. The steps of the method of manufacturing 80 are generally provided in FIG. 16. The first step 82 includes applying a first bonding agent to a socket component. The socket component may include a socket aperture, a central portion forming a periphery around the socket aperture, and an attachment base radially extending away from the central portion and the socket aperture. The attachment base may include a first surface on a stud-insertion side of the socket component and a second surface on the stud-exit side of the socket component. A shoulder may be included on the socket component to provide a transition between the second surface of the attachment base and the central portion.

Figure 16:
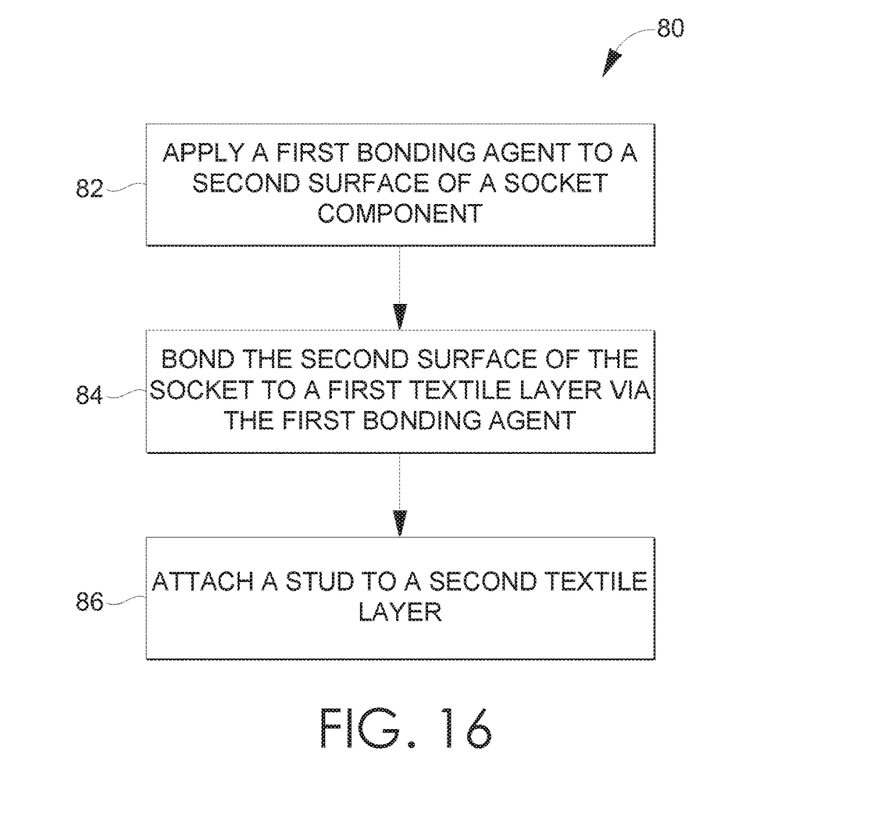
FIG. 16 depicts a flow diagram showing steps in a method of manufacturing a snap-type fastener arrangement in accordance with an aspect hereof.

At step 82, the first bonding agent may be applied to the socket component by depositing a layer 44 of the first bonding agent to the second surface 56 of the attachment base. Depositing a layer 44 of the first bonding agent to the second surface 56 may include positioning a bonding strip or bonding disk on the second surface. The bonding strip may include a socket surface, a textile surface, and a bonding aperture that corresponds to the shoulder of the socket component. The textile surface of the bonding strip may include an adhesive agent and may contact the second surface of the attachment base. The bonding strip and the second surface may be aligned so that the central portion of the socket component may extend through the bonding aperture.

Next, at step 84, the attachment base is bonded to a first textile layer. Specifically, the second surface of the attachment base may be bonded to a socket-facing surface of the first textile layer. The shoulder of the socket may be inserted into a first-textile aperture formed in the first textile layer, and the layer of the first bonding agent deposited on the second surface may couple the second surface to the socket-facing surface of the first textile layer. In some aspects, the first-textile aperture may be formed by laser cutting the first-textile aperture in the first textile layer, where the first-textile aperture may be sized to receive the shoulder of the socket component. Laser cutting the first-textile aperture in the first textile layer seals the textile edge around the first-textile aperture and reduces fraying of the material. Laser cutting would have a similar effect for other textile apertures in the snap-type fastener.

Lastly, at step 86, a stud-attachment base of a stud component is attached to a second textile layer. The stud component may include an extension member that extends away from the stud-attachment base and is insertable into the stud-insertion end of the socket aperture.

In some aspects, the method of manufacturing may also include bonding the first surface of the attachment base to a third textile layer. Bonding the attachment base to a third textile layer may be done by applying a second bonding agent to the first surface of the attachment base, to the third textile layer, or to both the first surface and to the third textile layer. A third-textile aperture in the third textile layer may be aligned with the stud-insertion end of the socket aperture, and the third textile layer may be pressed against the first surface of the attachment base. In other aspects, additional steps may be included in the method of manufacturing 80.

An exemplary aspect of the technology includes a snap-type fastener arrangement comprising a socket component that releasably mates with a stud component by releasably inserting into a socket aperture of the socket component. The socket component may include a stud-insertion side that generally faces in a direction from which the stud component advances when the stud component is inserted into the socket aperture and a stud-exit side that generally opposes the stud-insertion side and generally faces away from the direction from which the stud component advances when the stud component is inserted into the socket aperture. The socket component may further include a central portion forming a periphery around the socket aperture and an attachment base that radially extends away from the central portion and the socket aperture and that includes a first surface on the stud-insertion side and a second surface on the stud-exit side. The central portion may include a throat that defines a stud-insertion end of the socket aperture and may comprise a first thickness between the stud-insertion side and the stud-exit side. The attachment base may comprise a second thickness between the first surface and the second surface that is thinner than the first thickness of the central portion. Additionally, the socket component may include a shoulder that provides a transition between the second surface of the attachment base and the central portion, the shoulder increasing a thickness of the socket component. The second surface of the attachment base may be configured to receive a layer of a bonding agent that couples the second surface to a first textile layer. The stud component may include a stud-attachment base configured to attach the stud component to a second textile layer and an extension member that extends from the stud-attachment base and is insertable into the stud-insertion end of the socket aperture.

Another exemplary aspect of this technology is an article having a snap-type fastener arrangement for coupling a first portion of the article to a second portion of the article. The article may comprise the first portion of the article coupled to a socket component and the second portion of the article coupled to a stud component. The first portion of the article may be releasably attachable to the second portion of the article by releasably inserting the stud component into a socket aperture of the socket component. The first portion of the article may also comprise a first textile layer having an outward-facing surface and an inward-facing surface and a thickness extending between the outward-facing surface and the inward-facing surface. The first textile layer may include a socket-receiving aperture extending entirely through the thickness.

The article may further comprise the socket component that is coupled to the first textile layer and that includes a stud-insertion side that generally faces in a direction from which the stud component advances when the stud component is inserted into the socket aperture and a stud-exit side that generally opposes the stud-insertion side and generally faces away from the direction from which the stud component advances when the stud component is inserted into the socket aperture. The socket component may also have a central portion forming a periphery around the socket aperture and an attachment base that radially extends away from the central portion and the socket aperture and having a first surface on the stud-insertion side and a second surface on the stud-exit side. The central portion may include a first thickness between the stud-insertion side and the stud-exit side, while the attachment base may include a second thickness between the first surface and the second surface that is thinner than the first thickness. The central portion may include a throat that defines a stud-insertion end of the socket aperture and may extend through the socket-receiving aperture of the first textile layer. The second surface of the attachment base may be attached to the inward-facing surface of the first textile layer.

The socket component may also include a shoulder that provides a transition between the second surface of the attachment base and the central portion and increasing a thickness of the socket component. The shoulder may pass though the socket-receiving aperture of the first textile layer.

A further aspect of the present technology includes a method of manufacturing a snap-type fastener arrangement, which includes a socket component that releasably mates with a stud component by releasably inserting into a socket aperture of the socket component. The method may comprise applying a first bonding agent to the socket component. The socket component may include a stud-insertion side that generally faces in a direction from which the stud component advances when the stud component is inserted into the socket aperture and a stud-exit side that generally opposes the stud-insertion side and generally faces away from the direction from which the stud component advances when the stud component is inserted into the socket aperture. The socket may further include a central portion forming a periphery around the socket aperture and including a first thickness between the stud-insertion side and the stud-exit side. The central portion may also include a throat that defines a stud-insertion end of the socket aperture. The socket component may also include an attachment base that radially extends away from the central portion and the socket aperture and that includes a first surface on the stud-insertion side and a second surface on the stud-exit side. The attachment base may comprise a second thickness between the first surface and the second surface that is thinner than the first thickness. The socket component may also include a shoulder that provides a transition between the second surface of the attachment base and the central portion. The shoulder may increase a thickness of the socket component.

Continuing with the method of manufacture, applying the first bonding agent to the socket component may include depositing a layer of the first bonding agent to the second surface. The method further comprises bonding the second surface of the attachment base to a socket-facing surface of a first textile layer and attaching a stud-attachment base of the stud component to a second textile layer. The stud component may include an extension member that extends from the stud-attachment base and is insertable into the stud-insertion end of the socket aperture.

It will be understood that certain features and subcombinations are of utility and may be employed without reference to other features and subcombinations. This is contemplated by and is within the scope of the claims. Because many possible embodiments may be made of the invention without departing from the scope thereof, it is to be understood that all matter herein set forth or shown in the accompanying drawings is to be interpreted as illustrative and not in a limiting sense.

What is claimed is:

1. An article having a snap-type fastener arrangement, the article comprising:
   a socket component that releasably mates with a stud component by releasably inserting into a socket aperture of the socket component;
   a first textile layer coupled to the socket component, the first textile layer having an outward-facing surface and an inward-facing surface and a thickness extending between the outward-facing surface and the inward-facing surface, the first textile layer including a socket-receiving aperture extending entirely through the thickness;
   a second textile layer coupled to the stud component;
   the socket component comprising a thermoplastic polyurethane material and including:
      a stud-insertion side that generally faces in a direction from which the stud component advances when the stud component is inserted into the socket aperture;
      a stud-exit side that generally opposes the stud-insertion side and generally faces away from the direction from which the stud component advances when the stud component is inserted into the socket aperture;
      a central portion forming a periphery around the socket aperture and including a first thickness between a first surface on the stud-insertion side and a second surface on the stud-exit side, the second surface of the central portion including a collar portion defining a stud-exit end of the socket aperture, the central portion extending through the socket-receiving aperture of the first textile layer;
      an attachment base that radially extends away from the central portion and the socket aperture and that includes a first surface on the stud-insertion side and a second surface on the stud-exit side, the attachment base including a second thickness between the first surface of the attachment base and the second surface of the attachment base, the second thickness being thinner than the first thickness, wherein the attachment base is spaced apart from the socket aperture by the central portion, the second surface of the attachment base being attached to the inward-facing surface of the first textile layer; and
      a shoulder that provides a transition between the second surface of the attachment base and the second surface of the central portion, the shoulder increasing a thickness of the socket component, the second surface of the attachment base configured to receive a layer of a bonding agent that couples the second surface of the attachment base to the first textile layer; and
   the stud component including a stud-attachment base thattached to the second textile layer and an extension member that extends from a stud-attachment base and is insertable into a stud-insertion end of the socket aperture, wherein the stud component is configured to frictionally engage the collar portion of the socket component when the stud component is axially inserted through the socket aperture and extends through the stud-exit end of the socket aperture.

2. The snap-type fastener arrangement of claim 1, wherein the snap-type fastener arrangement includes a third thickness between the first surface of the attachment base and the outward-facing surface of the first textile layer, the third thickness being less than the first thickness of the central portion.

3. The snap-type fastener arrangement of claim 1, further comprising a third textile layer coupled to the first surface on the stud-insertion side of the attachment base, the third textile layer including a textile aperture that is aligned with the socket aperture, the stud component passing through the textile aperture when the stud component is inserted into the stud-insertion end of the socket aperture.

4. The snap-type fastener arrangement of claim 1, further comprising a second shoulder that provides a transition between the first surface of the attachment base and first surface of the central portion, the second shoulder increasing a thickness of the socket component.

5. The snap-type fastener arrangement of claim 1, wherein the stud component includes an axially aligned portion that is aligned with an axis of the socket aperture and a radially extending portion that extends radially outward, and wherein the radially extending portion is larger than the collar portion.

6. The snap-type fastener arrangement of claim 1, wherein the collar portion and the throat are annular.

7. An article having a snap-type fastener arrangement for coupling a first portion of the article to a second portion of the article, the article comprising:
   the first portion of the article coupled to a socket component;
   the second portion of the article coupled to a stud component, wherein the first portion of the article is releasably attachable to the second portion of the article by releasably inserting the stud component into a socket aperture of the socket component;
   the first portion of the article including a first textile layer having an outward-facing surface and an inward-facing surface and a thickness extending between the outward-facing surface and the inward-facing surface, the first textile layer including a socket-receiving aperture extending entirely through the thickness; and
   the socket component that is coupled to the first textile layer including:
      a stud-insertion side that generally faces in a direction from which the stud component advances when the stud component is inserted into the socket aperture;

a stud-exit side that generally opposes the stud-insertion side and generally faces away from the direction from which the stud component advances when the stud component is inserted into the socket aperture;

a central portion forming a periphery around the socket aperture and including a first thickness between a first surface on the stud-insertion side and a second surface on the stud-exit side, the second surface of the central portion including a collar portion defining a stud-exit end of the socket aperture, the central portion extending through the socket-receiving aperture of the first textile layer wherein the first thickness is in a range of 0.004 inches to 0.008 inches; and an attachment base that radially extends away from the central portion and the socket aperture and that includes a first surface on the stud-insertion side and a second surface on the stud-exit side, the attachment base including a second thickness between the first surface of the attachment base and the second surface of the attachment base, wherein the second thickness is thinner than the first thickness, wherein the attachment base is spaced apart from the socket aperture by the central portion, the second surface of the attachment base being attached to the inward-facing surface of the first textile layer; and a shoulder that provides a transition between the second surface of the attachment base and the second surface of the central portion, the shoulder increasing a thickness of the socket component, the shoulder passing through the socket-receiving aperture of the first textile layer;

wherein the stud component is configured to be frictionally engaged with the collar portion of the socket component when the stud component is axially inserted through the socket aperture and extends through the stud-exit end of the socket aperture.

8. The article of claim 7, further comprising a second textile layer coupled to the first surface of the attachment base.

9. The article of claim 8, wherein the first textile layer and the second textile layer form a placket on an apparel item.

10. The article of claim 7, wherein the first portion of the article comprises a first end of a garment collar and the second portion of the article comprises a second end of a garment collar.

11. The snap-type fastener arrangement of claim 1, wherein the first thickness is in a range of 0.004 inches to 0.008 inches.

12. The article of claim 7, wherein the socket component comprises a base layer of a thermoplastic polyurethane material and a top layer of the thermoplastic polyurethane material on the base layer.

* * * * *